United States Patent
Mason (10) Patent No.: US 8,462,936 B2
(45) Date of Patent: Jun. 11, 2013

(54) ADAPTIVE DELAY COMPENSATION FOR ACOUSTIC ECHO CANCELLATION

(75) Inventor: Steven G. Mason, Vancouver (CA)

(73) Assignee: QNX Software Systems Limited, Kanata, Ontario (CA)

(*) Notice: Subject to any disclaimer, the term of this patent is extended or adjusted under 35 U.S.C. 154(b) by 129 days.

(21) Appl. No.: 13/036,861

(22) Filed: Feb. 28, 2011

(65) Prior Publication Data

US 2012/0219146 A1    Aug. 30, 2012

(51) Int. Cl.
    *H04M 9/08*    (2006.01)
(52) U.S. Cl.
    USPC .................................................. 379/406.04
(58) Field of Classification Search
    USPC .................................................. 379/406.04
    See application file for complete search history.

(56) References Cited

U.S. PATENT DOCUMENTS

| | | | |
|---|---|---|---|
| 4,582,963 A | 4/1986 | Danstrom | |
| 6,654,463 B1 | 11/2003 | Leonidov et al. | |
| 6,775,653 B1 * | 8/2004 | Wei ................. | 704/248 |
| 6,778,671 B1 | 8/2004 | Graumann | |
| 7,613,291 B1 | 11/2009 | Benyassine et al. | |
| 2004/0028217 A1 | 2/2004 | Ebenezer et al. | |
| 2004/0062386 A1 | 4/2004 | Tahernezhaadi et al. | |
| 2005/0220043 A1 | 10/2005 | Handel et al. | |
| 2006/0140392 A1 * | 6/2006 | Ahmadi ............. | 379/406.1 |
| 2007/0274535 A1 * | 11/2007 | Mao ..................... | 381/94.1 |
| 2009/0129584 A1 * | 5/2009 | Aoyagi et al. ........ | 379/406.06 |
| 2009/0316924 A1 | 12/2009 | Prakash et al. | |
| 2010/0215185 A1 | 8/2010 | Christoph | |
| 2010/0226492 A1 * | 9/2010 | Takada ............. | 379/406.08 |
| 2010/0290615 A1 | 11/2010 | Takahashi | |

FOREIGN PATENT DOCUMENTS

CN    1412958 A    4/2003

* cited by examiner

*Primary Examiner* — Alexander Jamal
(74) *Attorney, Agent, or Firm* — Brinks Hofer Gilson & Lione (57) ABSTRACT

An acoustic echo cancellation system buffers remote side signals to one or more storage areas. A delay controller filters and delays the remote side signals to correlate the remote side signals to local side signals. An acoustic echo cancellation core pulls the remote side signals from the buffer through a delay controller. A delay estimator generates an estimate of a delay between the buffered remote side signals and the local side signals. The delay estimator renders a confidence level that indicates a degree of likelihood for each potential match between delayed remote side signals and the local side signals. The acoustic echo cancellation core substantially cancels a portion of the echo or reverberation within the local side signals based on the estimate of the delay and the confidence level.

23 Claims, 10 Drawing Sheets

ADAPTIVE DELAY COMPENSATION FOR ACOUSTIC ECHO CANCELLATION

BACKGROUND OF THE INVENTION

1. Technical Field

This application relates to communication, and more specifically to, acoustic echo cancellation.

2. Related Art

Acoustic echo cancellation systems may be calibrated for fixed time delays between a transmission and a reception of a signal. As equipment changes, the timing between the transmission and reception of the signal may change, which may cause some echo cancellation systems to become uncalibrated. Uncalibrated systems may cause audio signals to become distorted often resulting in poor audio quality.

Distortion may be noticeable in mobile devices. When used in a vehicle or with a docking station, the output of the mobile device may be redirected to devices that introduce additional buffering, audio processing, and conversions. The latency of these processes can cause significant time delays. Some acoustic echo cancellation systems do not adapt or even detect such delays, and rather than removing repetitive echo and reverberations, the systems reduce intelligibility and audio quality.

SUMMARY

An acoustic echo cancellation system buffers remote side signals to one or more storage areas. A delay controller filters and delays the remote side signals to correlate the remote side signals to local side signals. An acoustic echo cancellation core pulls the remote side signals from the buffer through a delay controller. A delay estimator continuously or intermittently generates an estimate of a delay between the buffered remote side signals and the local side signals. The delay estimator renders a confidence level that indicates a degree of likelihood for each potential match between delayed remote side signals and the local side signals. The acoustic echo cancellation core substantially cancels a portion of the echo or reverberation within the local side signals based on the estimate of the delay and the confidence level.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and descriptions. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE PREFERRED EMBODIMENTS

A system and process enhances the intelligibility between an input and an output in a hands-free, landline, or other communication system. The hardware and software of the system and process may capture and copy remote side signals that are converted into audible sound. The direct sound delivered through the acoustic echo path, its reverberations, and its alterations (e.g., the secondary reflections) may be identified and substantially dampened or attenuated. The system may effectively model the audible sound, its receiving device, and acoustical properties of the receiving environment to efficiently cancel echo, and in some applications, reverberation. The systems and processes anticipate remote side signals (and their alterations) that are likely to re-enter a transmission path by detecting the delay between the remote side signals and the local side signals. The system dynamically delays copies of the remote side signals. The dynamic delay may change when confidence levels are reached, when a temporal heuristic renders an adjustment, when a predetermined probability is achieved, and/or when one or more empirical events or states occur. By processing the remote side signals, the system may converge to render a significant dampening or attenuation of an echo or reverberation in a short period of time (e.g., less than hundreds of milliseconds).

Figure 1:
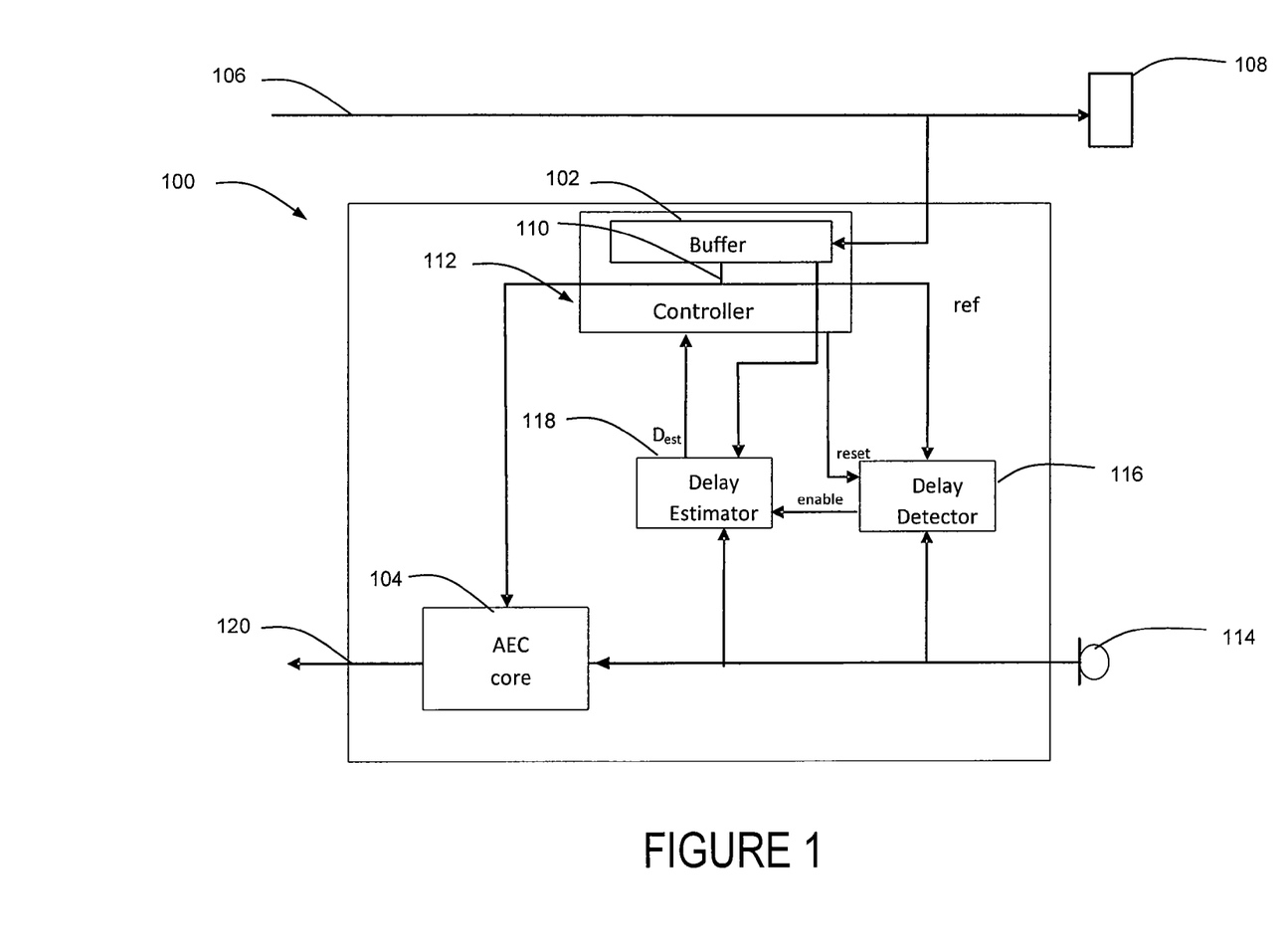
FIG. 1 is an acoustic echo cancellation system with adaptive delay.
Figure 2:
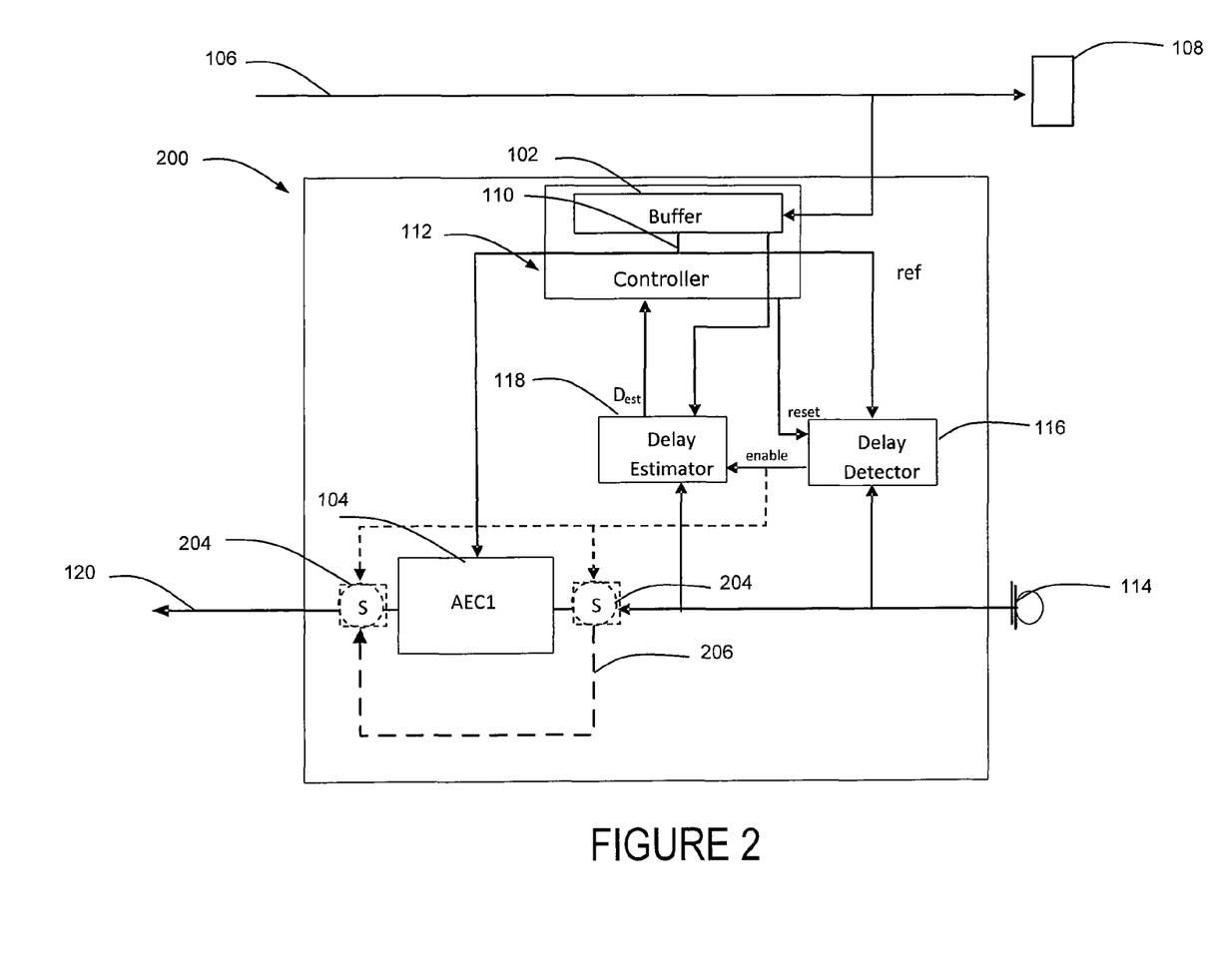
FIG. 2 is an alternative acoustic echo cancellation system with adaptive delay.
Figure 9:
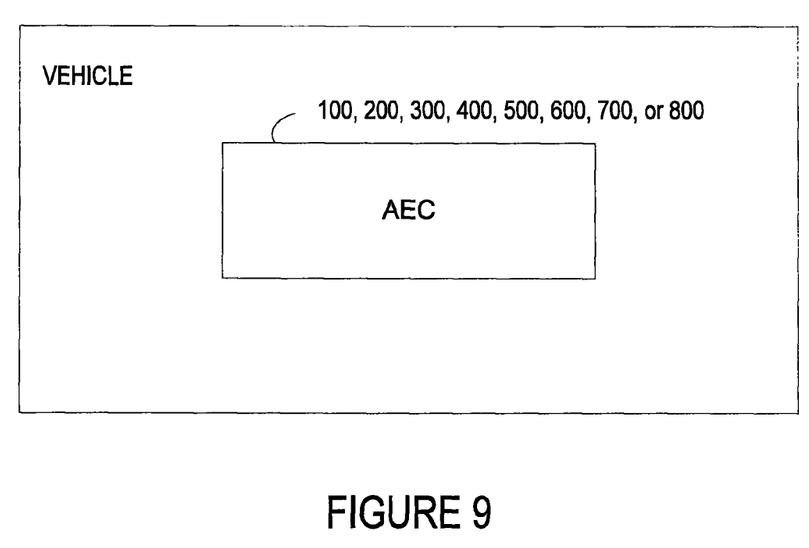
FIG. 9 is a vehicle interfacing or integrating (e.g., a unitary part of) the acoustic echo cancellation systems of FIGS. 1-4 and/or the acoustic echo cancellation processes of FIGS. 6-8.
Figure 10:
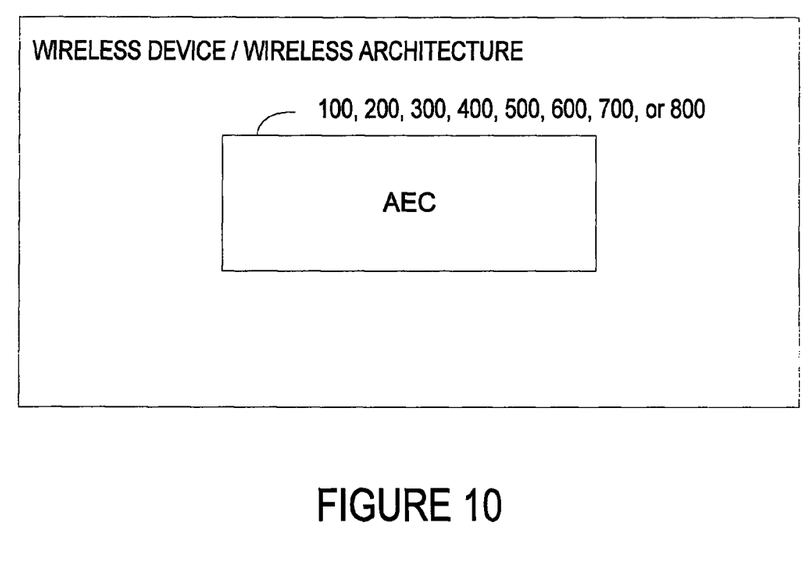
FIG. 10 is a wireless device/wireless architecture interfacing or integrating (e.g., a unitary part of) the acoustic echo cancellation systems of FIGS. 1-4 and/or the acoustic echo cancellation processes of FIGS. 6-8.

FIG. 1 is an acoustic echo cancellation system 100 with an adaptive delay. The system may be part of a video or teleconferencing system, a vehicle (e.g., FIG. 9) or comprise a unitary part of a wireless device and/or wireless architecture (e.g., FIG. 10). The system 100 may include a buffer 102 such as a sequential buffer, a circular buffer, a ping pong buffer, or a double buffer, for example, that provides variable delay of the remote side signal to an acoustic echo cancellation element or core 104. Logically distinct portions of the buffer 102 (e.g., partitions) may function as physically separate nonvolatile memory units that may comprise a unitary or parallel structure. The buffer 102 may alternatively write the remote side signals sampled from the transmission path 106 to one or more storage areas and then read and transmit data stored in the other storages areas to the acoustic echo cancellation element or core 104 after a dynamic delay. Rather than holding information coming and going to particular input and output devices based on memory write cycles that may introduce more latency, some buffers 102 may provide a substantially continuous input of remote side signals to the acoustic echo cancellation core 104 at an established delay The remote side signals are converted into an aural or audible sound by transducer 108 or loudspeaker.

The acoustic echo cancellation core 104 may pull the remote side signal from a buffer tap 110 associated with the delay controller 112. The delay controller 112 filters and delays the remote side signals to positively resemble or correlate to the local side signal that is received at a sensor or input 114. In FIG. 1, the input 114 may comprise a transducer or device that coverts sound into analog or digital data such as a microphone. When there is a high similarity, co-relation, correlation or coherence between the resultant (e.g., filtered and delayed) remote side signal and the local side signal, the acoustic echo cancellation core 104 substantially cancels the echo or reverberation rendering a processed signal 120 that represents the sound present in a room or an environment with substantially little direct echo or reverberated sound from the local side speaker. The attenuation or dampening may occur through various techniques or elements such as through a subtractor, adaptive filter, frequency shifter, etc. The suppression may occur in one or more formats (e.g., analog or digital), within one or more processing domains such as the time domain, the frequency domain, the wavelet domain, etc. In some applications, the remote side and local side signals are converted from an analog to digital format and converted from the temporal domain to the frequency domain, before the local side and the remote side signals are converted back to their temporal or origin processing domains and formats.

When the local side and remote side signals are not similar or different such as when the signals lack a spectral coherence or temporal coherence, for example, the difference between the signals may be detected by the delay detector 116. The delay detector 116 may automatically identify and record in memory differences or coherent changes between the buffered remote side signal and the local side signal. The delay detector 116 compares the filtered reference signal to the input signal looking for evidence that that the signals are different, or in some applications, significantly different in real-time or near real time.

In some systems, the delay detection is mirrored or duplicated in the acoustic echo cancellation core 104. In these alternative systems, any changes or significant differences between the buffered remote side signal and the local side signal, such as differences in spectral coherence, for example, is also detected by the acoustic echo cancellation core 104. So if the delay detector 116 fails or becomes corrupted, the acoustic echo cancellation core 104 may identify and record the signal changes in memory. The ability of these alternative acoustic echo cancellation systems to respond to failures or catastrophic events or faults ensures that substantially no communication or perceptual quality is lost for failure to detect differences, such as spectral or temporal coherence differences. The fault tolerance of these alternative acoustic echo cancellation systems, allows the system to continue operation while a fault recovery process (e.g., the delay detector 116 is reset, shut down, etc.) or an error control is initiated (e.g., initiating an error correction, informing a user or entity of an error code, etc.).

When a lack of similarity is detected such as differences in spectral coherence for a predetermined period of time, the delay estimator 118 may be enabled. In FIG. 1, the delay estimator 118 is enabled by the delay detector 116; in other systems, the delay estimator 118 is enabled by the acoustic echo cancellation core 104 exclusively, in combination with the delay estimator 118, or continuously generates estimates without an enabling signal (e.g., some systems do not include a delay detector 116). Once activated, the delay estimator 118 continually generates an estimate of the current delay "Dest" between the stored remote side signal shown as the "ref" signal in FIGS. 1-4 and the unaltered local side input signal.

The delay estimator 118 may compare the entire buffered remote side signal (or a portion thereof) to the unaltered local side signal received at the sensor or input 114. The similarity, co-relation, and/or correlation between the signals is measured and a delay estimate rendered and stored in memory. In some systems 100, the delay estimation occurs through a correlation in the time domain. In other systems, the delay is estimated by other measures such as a time series amplitude matching, etc. that may be processed in the temporal or other operating domains (e.g., a frequency based correlation, etc.).

Once a high confidence level is reached or a highest confidence threshold is achieved, or a temporal heuristic indicates little variability, or a predetermined probability of a stable estimate is achieved and/or an empirical stability is attained, the delay estimator 118 adjusts the latency of the buffer tap 110 associated with the delay controller 112. In some systems 100, the confidence level indicates a degree of confidence or a discrete value (e.g., a binary value) for each potential match between delayed remote side signals and the local side signals. In some systems the confidence level is the degree of certainty that a prediction is accurate or that a failure rate is not exceeded. In some systems the confidence level is the probability that a delay value lies within a predetermined or programmed interval.

When the acoustic echo cancellation core 104 receives the newly delayed remote side signal, the delay controller 112 may reset or lock out the delay detector 116, which in turn may disable the delay estimator 118 in some systems. In these systems the delay detector 116 may remain in a "lockout" state for a variable period. The delay detector 116 may be locked out until the acoustic echo cancellation core 104 models the acoustic space or audio path, the local side speaker, and the sensor or input 114 or when the acoustic echo cancellation core 104 converges to a cancellation level at a certain rate or with in a predetermined period of time (e.g., 25 dB of cancellation in around 25 ms). In some systems, the delay detector 116 may remain locked out for a predetermined period of time that may be measured by an internal or external timer or counter. In these systems, the fixed lockout period may ensure that the delay detector 116 does not latch into a continuous lockout state. Some systems may not include a delay detector 116. In these systems the delay estimator 118 may operate continuously rather than in a gated configuration.

Figure 3:
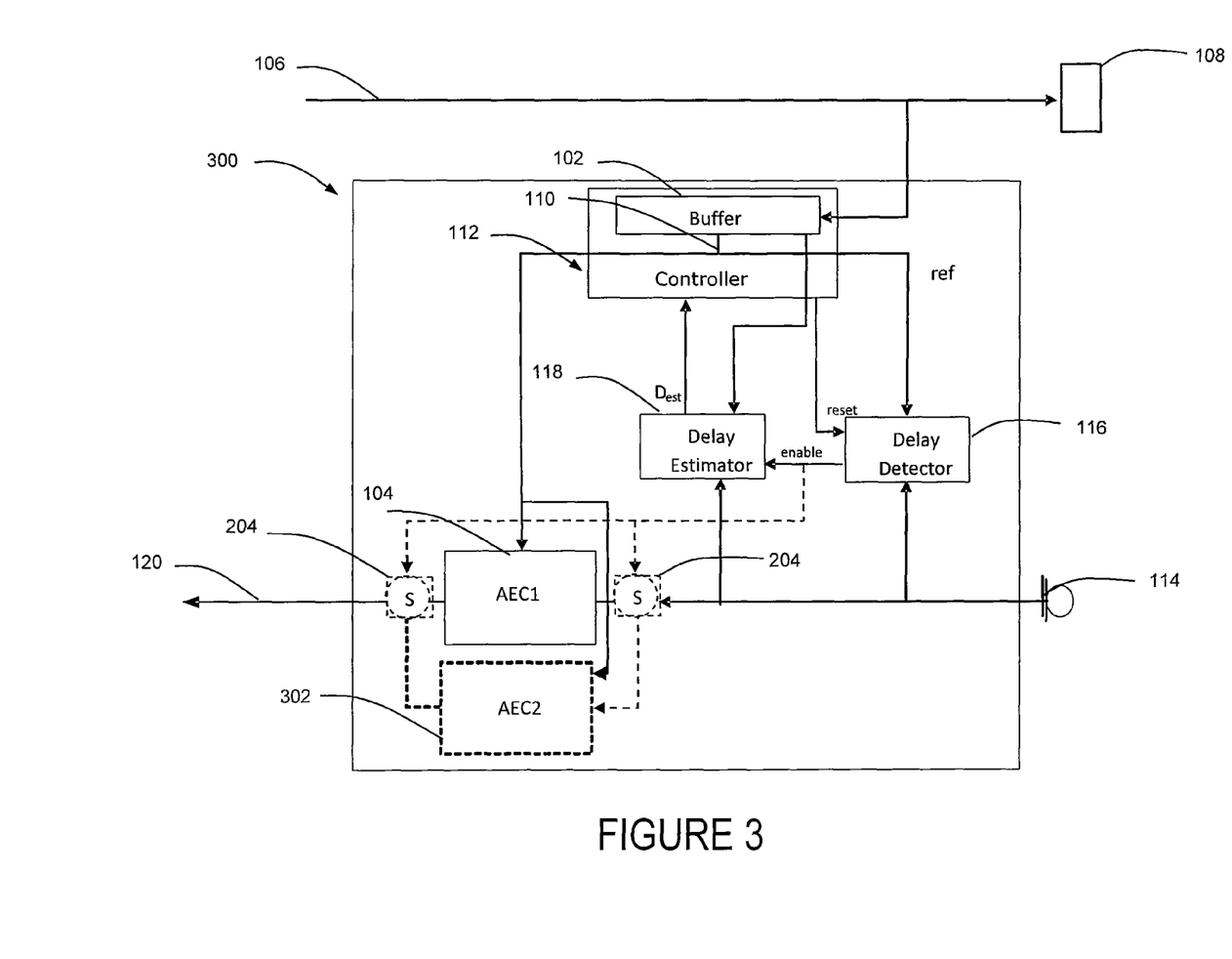
FIG. 3 is a second alternative acoustic echo cancellation system with adaptive delay.
Figure 4:
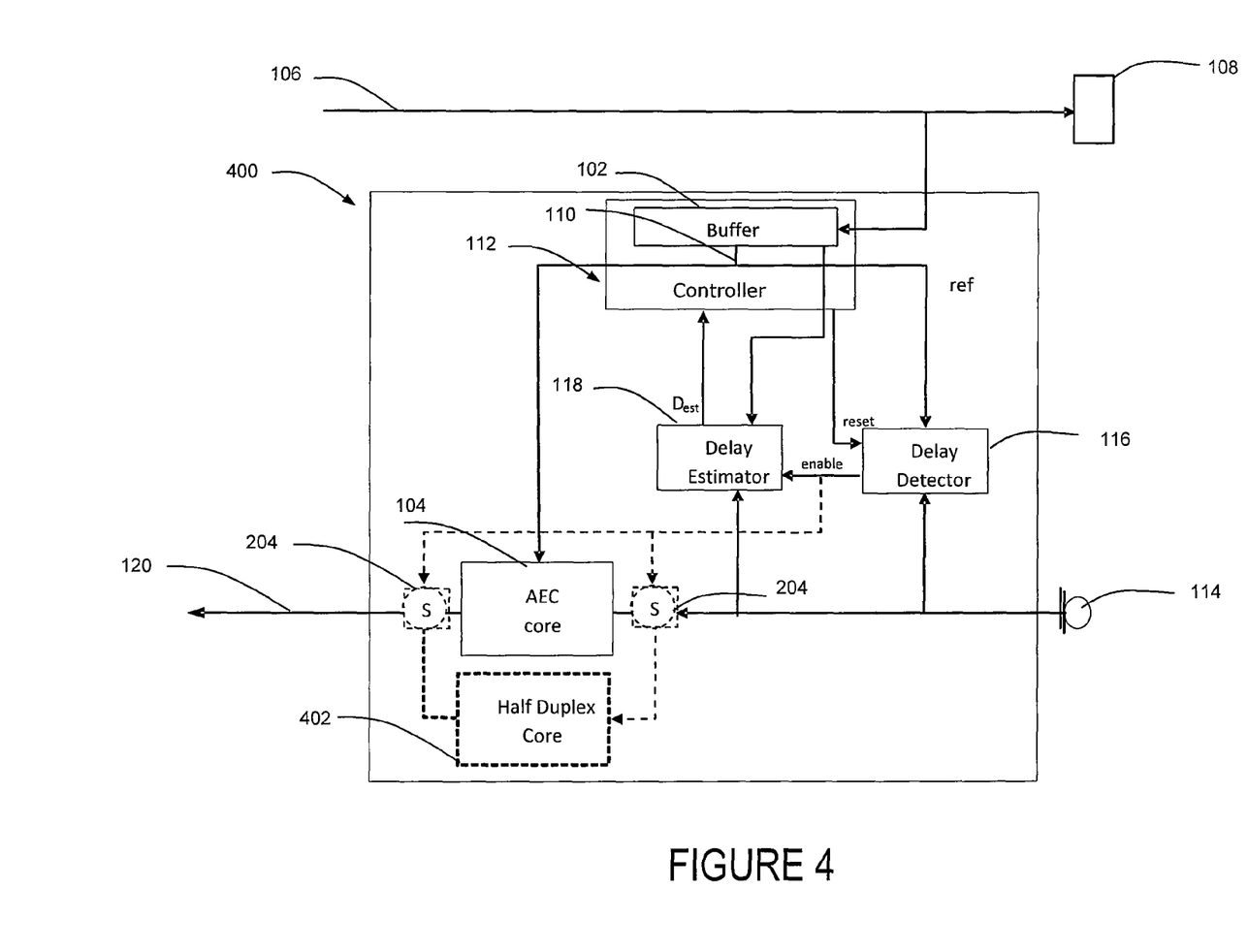
FIG. 4 is a third alternative acoustic echo cancellation system with adaptive delay.

As the acoustic echo cancellation core 104 determines the nature of the filtering to be applied to the remote side signal such that it resembles the local side signal, some acoustic echo cancellation systems 200 may disable the acoustic echo cancellation core 104 while the delay detector 116 is in a lockout state. In some acoustic echo cancellation systems such as the system shown in FIG. 2, control devices 204 may pass the local side signal as if there were no intermediate processing by routing the local side signal through a signal path 206 that bypasses the acoustic echo cancellation core 104. The control line (e.g., enable line) of the delay detector 116 controls the routing and operation of signal path 206 through electrical or electromechanical switches 204. In FIG. 3, the control line (e.g., enable line) of the delay detector 116 enables the routing of the input through one or more secondary acoustic echo cancellation cores 302 that may comprise one or more echo suppressors, echo cancellers, or in some applications, a combination of echo suppressors and echo cancellers coupled in series (not shown) or parallel (shown in FIG. 3) with the acoustic echo cancellation core 104. The nature of the filtering to be applied by the secondary acoustic echo cancellation cores 302 of the alternative echo cancellation system 300 may be such that the remote side signals may resemble the local side signals by filtering and applying a fixed delay to the remote side signals. In the case of echo suppressors, echo and reverberation may be suppressed by allowing signals to flow sequentially in a local or a remote direction, but not simultaneously in time. In FIG. 4, an alternative secondary acoustic echo cancellation core 402 may carry information from the local side speaker when a remote side speaker is not talking through a half-duplex core 402. Like the echo cancellation systems 200 shown in FIG. 2, echo cancellation systems 300 and 400 shown in FIGS. 3 and 4 may enable the secondary acoustic echo cancellation cores 302 and 402 while the delay detector 116 is in a lockout state, for a predetermined time period, or when a failure or fault condition is detected. A fault condition may occur when the acoustic echo cancellation core 104 fails. The fault tolerance of these alternative acoustic echo cancellation systems 200, 300, and 400 improves the perceptual quality of a call (or communication) and increases the capacity of the communication system by preventing echo and reverberation from traveling across a communication network.

The calibration of the acoustic echo cancellation systems 100, 200, 300, and 400 with the adaptive delay may vary by application and available resources. When the acoustic echo cancellation systems 100, 200, 300, and 400 require training with minimal Central Processing Unit (CPU) cycles, the delay detector 116 may aggressively compare the filtered reference signal to the input signal at the beginning of a call, and execute fewer comparisons during the duration of the call or after a predetermined or programmed period. In some phone, video conferencing, mobile communication and/or vehicle applications, the acoustic echo cancellation systems 100, 200, 300, and 400 may self-calibrate when a phone rings or a perceptible alert of an incoming communication is received. Once calibrated, the acoustic echo cancellation systems 100, 200, 300, and 400 may store the last calculated delay and readjust or confirm the delay when the acoustic echo cancellation systems 100, 200, 300, and 400 are reactivated. Alternatively, the acoustic echo cancellation systems 100, 200, 300, and 400 may initiate the filtering and delay at a predetermined configurations and values and readjust the parameters or confirm the parameters as the system operates.

Figure 5:
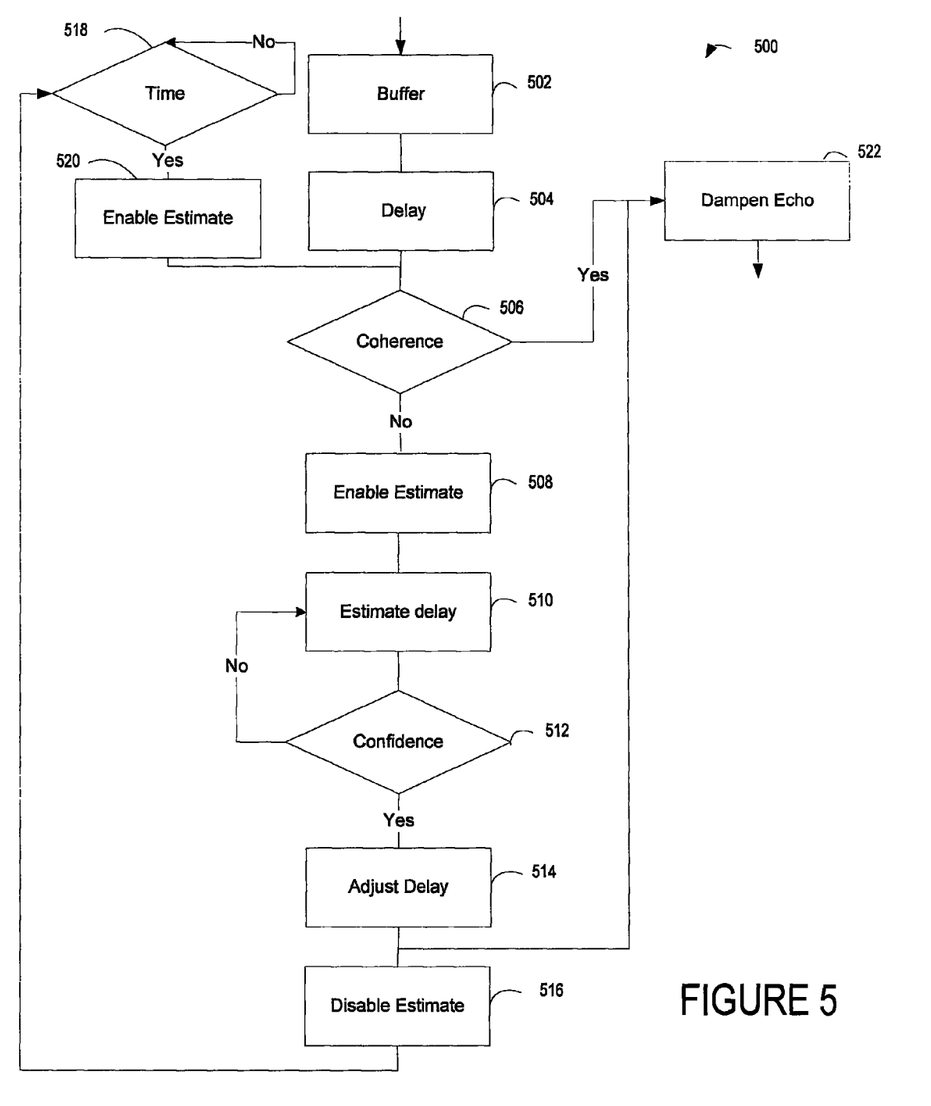
FIG. 5 is an acoustic echo cancellation process.

In FIG. 5 a full audio or partial audio (e.g., 300 Hz-3 kHz) bandwidth is processed to minimize or exclude echo, reverberations, and its alterations (e.g., the secondary reflections). The process 500 alternatively writes the remote side signals sampled from a transmission path to one or more storage areas in a buffer or database and then reads the data stored in the other storages areas or databases at 502. An acoustic echo cancellation process may pull the remote side signal through a controller that filters and delays the remote side signal to positively resemble or correlate to a local side signal at 504.

When there is a high similarity or minimal difference between the resultant (e.g., filtered and delayed) remote side signal and the local side signal at 506, the acoustic echo cancellation process substantially cancels the echo or reverberation rendering a processed signal that represents the sound present in the environment with substantially little direct echo or reverberated sound from the local side speaker at 522. The attenuation or dampening may occur through various processes such as through a subtracting process, an adaptive filtering process, a frequency shifting process, etc. The suppression may occur in one or more formats (e.g., analog or digital), within one or more processing domains such as the time domain, the frequency domain, the wavelet domain, etc.

When the local side and remote side signals are not similar or lack a spectral coherence or temporal coherence, for example, the difference between the signals may be detected. The detection process may automatically identify and record the differences in memory (or a local or distributed database) between the buffered remote side signal and the local side signal. The detection process compares the filtered reference signal to an input signal looking for evidence that that the signals are different, or in some applications coherently different in real-time or near real time.

In some systems, the delay detection is mirrored or duplicated in a secondary detection process. In these alternative processes, any changes or significant differences between the stored remote side signal and the local side signal, such as differences in spectral coherence is also detected by the secondary detection process. So if a first detection process fails or becomes corrupted, the second detection process may identify and record the changes in a memory or a database. The ability of these alternative acoustic echo cancellation detection processes to respond to failures or catastrophic events or faults ensures that substantially no communication or perceptual quality is lost for failure to detect differences, such as spectral or temporal coherence differences. The fault tolerance of these processes, allows the overall process to continue operation while a fault recovery process or an error control process is initiated (e.g., initiating an error correction, informing a user or entity of an error code, etc.).

When a lack of a strong similarity is detected for a predetermined period, an estimation process may be enabled at 508. Once enabled, the delay estimation process continually generates an estimate of the current delay between the stored remote side signal and the unaltered local side input signal. The delay estimation process 510 may compare the entire buffered remote side signal (or a portion thereof in alternative systems) to the unaltered local side signal. The similarity or co-relation between the signals is measured and a delay estimate rendered and stored in memory. In some processes, the delay estimation occurs through a coherence or correlation in the time domain. In other processes, the delay is estimated by other measuring processes such as a time series amplitude matching, etc. that may be processed in the temporal or other operating domains (e.g., a frequency based correlation, etc.).

Once a high confidence level or confidence threshold value is reached, or a temporal heuristic indicates little variability, or a predetermined probability of a stable estimate is achieved and/or an empirical stability is attained at 512, a controller adjusts the delay at 514. When the acoustic echo cancellation process receives the newly delayed remote side signal, the process may temporarily reset or lock out additional delay detections which in turn may disable additional delay estimates 516. The delay detection process may remain in a "lockout" state for a variable period of time. The delay detection process may be locked out until the acoustic echo cancellation process models the acoustic space or audio path, the local side speaker, and the sensor or input. In some processes, the delay detection process may remain locked out for a predetermined period of time at 518. In these processes, the fixed lockout period may ensure that the delay detection process does not latch into a continuous lockout state at 520. In some other processes, 516-520 are not practiced. In these processes, the delay estimation process 510 may operate continuously without entering a lockout state.

Figure 6:
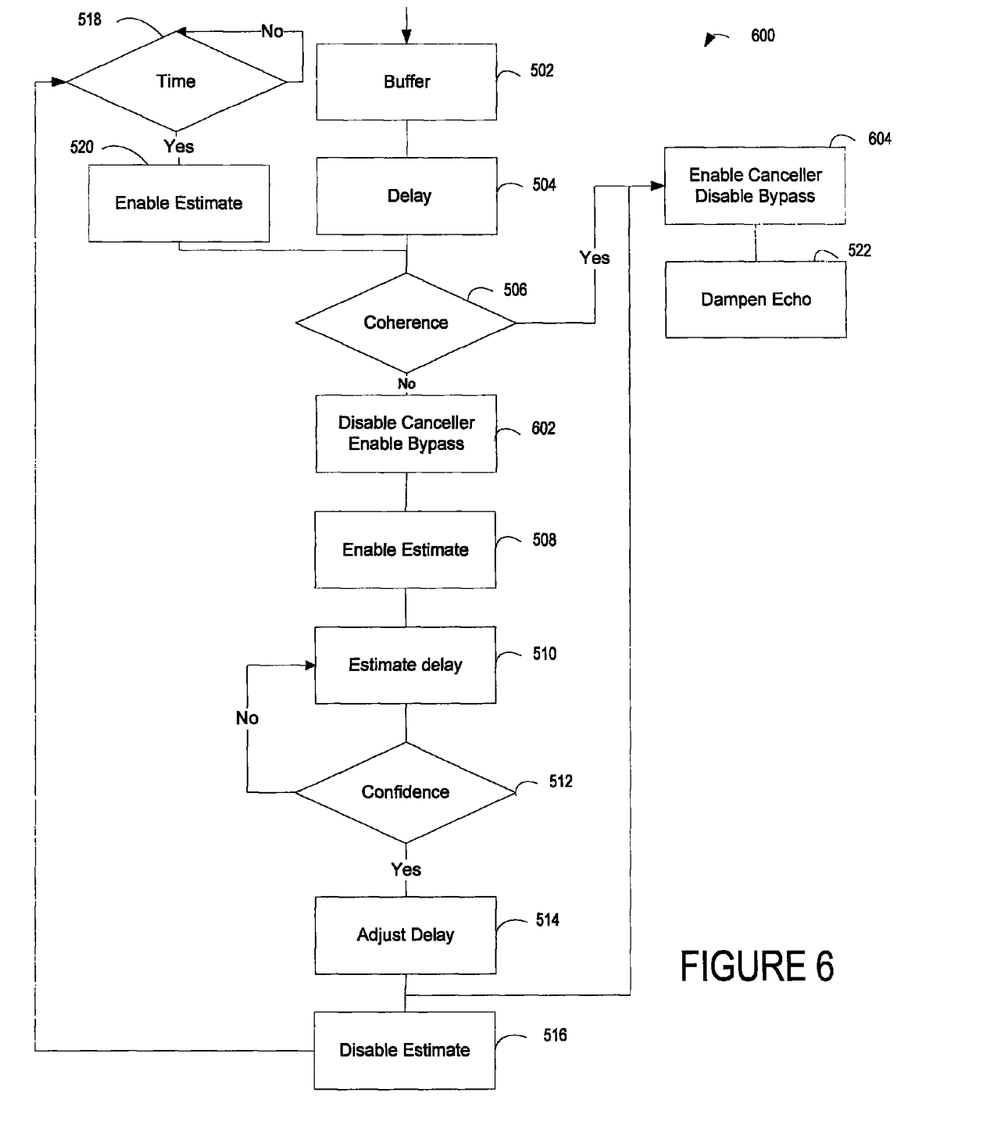
FIG. 6 is an alternative acoustic echo cancellation process.
Figure 7:
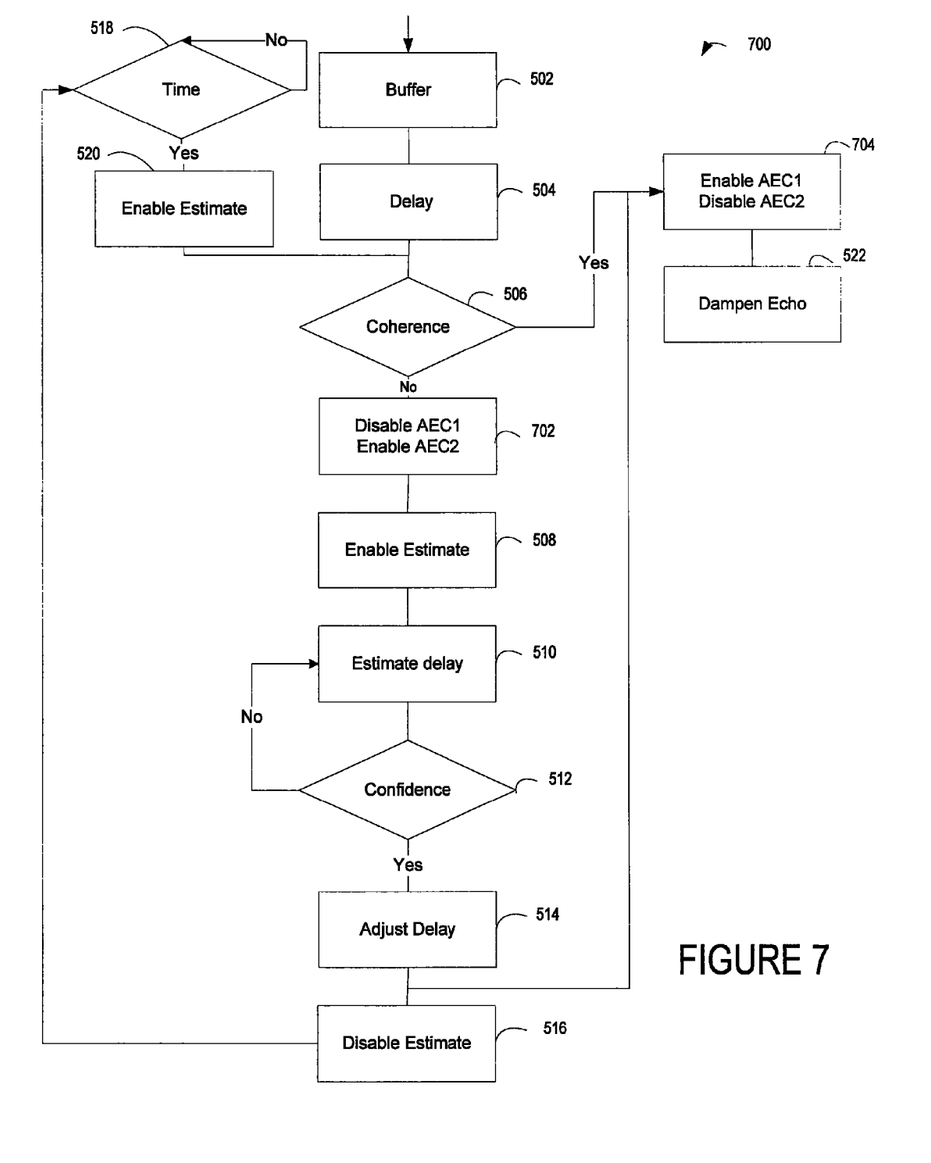
FIG. 7 is a second alternative acoustic echo cancellation process.
Figure 8:
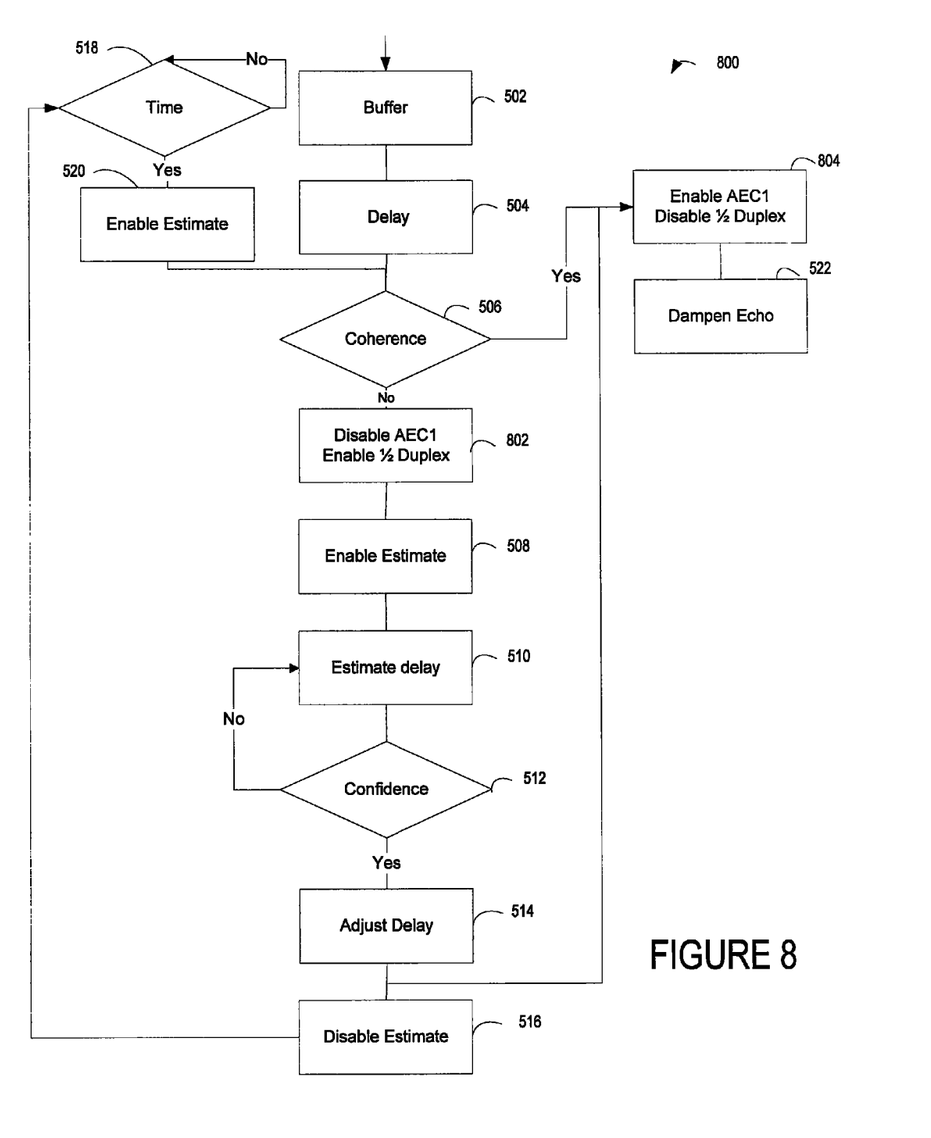
FIG. 8 is a third alternative acoustic echo cancellation process.

As the acoustic echo cancellation process determines the nature of the filtering to be applied to the remote side signal such that it resembles the local side signal, some acoustic echo cancellation processes may disable acoustic echo cancellation while the delay detection process is in a lockout state. In some acoustic echo cancellation processes such as the process shown in FIG. 6, a control process may pass the local side signal as if there were no intermediate processing by routing the local side signal through a signal path that bypasses acoustic echo cancellation at 602. The delay detection process 600 may control the routing that is enabled at 604 after the delay is adjusted. In FIG. 7, a delay detection process 700 enables the routing of the input through one or more secondary acoustic echo cancellation processes at 702 that may comprise one or more echo suppressors, echo cancellers, or in some applications, a combination of echo suppressors and echo cancellers coupled in series or parallel. The nature of the filtering to be applied by the secondary acoustic echo cancellation process (AEC2) of the alternative echo cancellation process 700 may be such that the remote side signals may resemble the local side signal by filtering and applying a fixed delay to the remote side signals. In the case of echo suppressors, echo and reverberation may be suppressed by allowing signals to flow sequentially in a local or a remote direction, but not simultaneously in time. Like the process shown in FIG. 6, the secondary acoustic echo cancellation processes of FIG. 7 may be disabled after the delay is adjusted or confirmed at 704. In FIG. 8, an alternative secondary acoustic echo cancellation process that enables a half-duplex operation 802 may carry information from the local side speaker when a remote side speaker is not talking. Like the echo cancellation process 500 shown in FIG. 5, echo cancellation processes 600 and 700 shown in FIGS. 6 and 7, respectively, may enable the secondary acoustic echo cancellation cores 302 and 402 while the delay detection process is in a lockout state, for a predetermined time period, or when a failure or fault condition is detected. A fault condition may occur when one or more of the acoustic echo cancellation processes fails. The fault tolerance of these alternative acoustic echo cancellation processes 500, 600, and 700 improve the perceptual quality of a call (or communication) and increases the capacity of the communication system by preventing echo and reverberation from traveling across a communication network.

The systems, methods, and descriptions provided herein may program one or more signal processors 1102 (shown in FIG. 11 executing different program code) or may be encoded in a signal bearing storage medium, a computer-readable medium, or may comprise logic 500-800 stored in a memory or database that may be accessible through an interface and is executable by one or more processors such as slave processors. Some signal-bearing storage medium or computer-readable medium comprise a memory that is unitary or separate (e.g., local or remote) from a device, programmed within a device, such as one or more integrated circuits, or retained in memory or database and/or processed by a controller or a computer. If the descriptions or methods are performed by program code or software, the program code, software, or logic 500-800 may reside in an electronic or optical memory or databases resident to or interfaced to one or more processors, devices, or controllers that may support a tangible or visual communication interface (e.g., to a display), wireless communication interface, or a wireless system.

Figure 11:
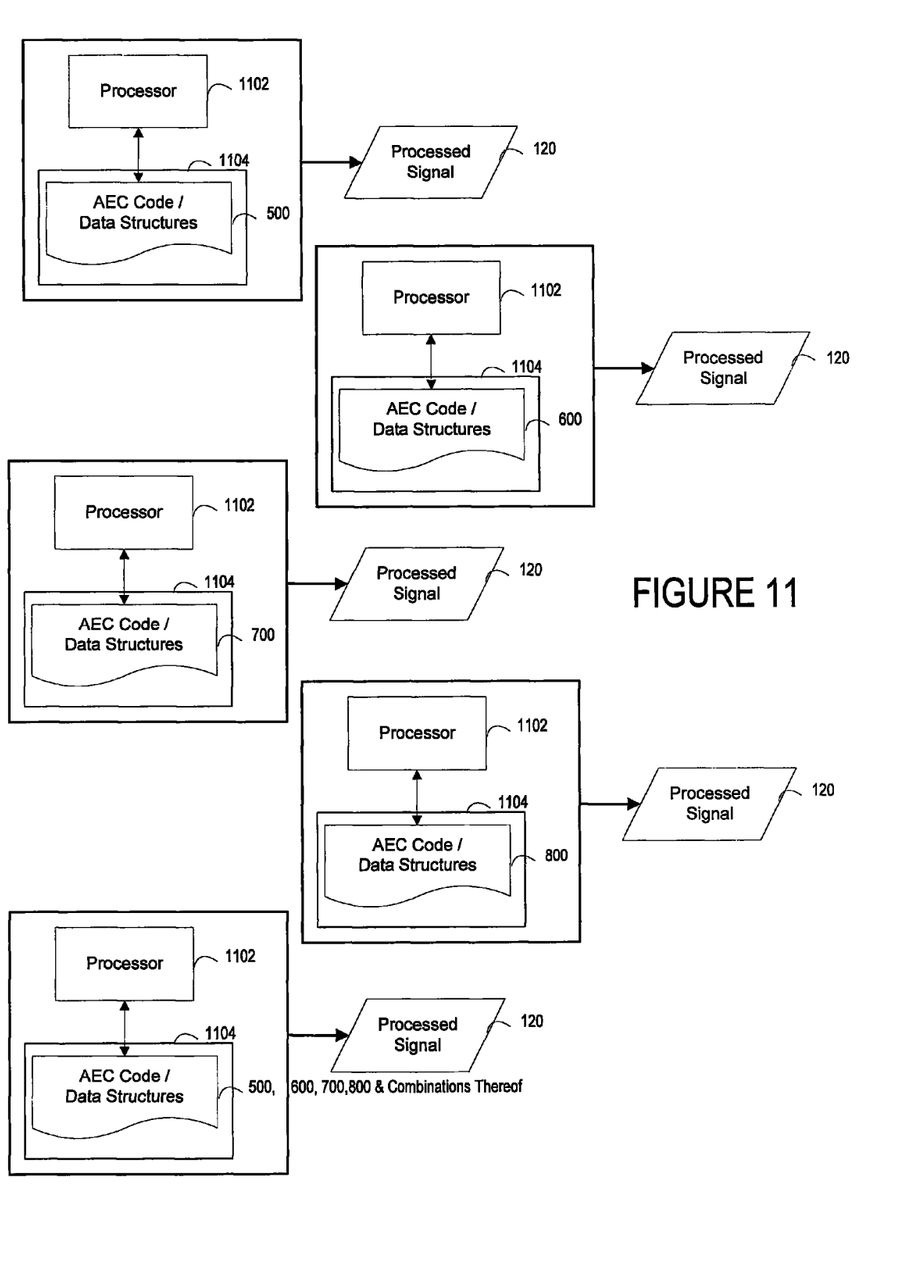
FIG. 11 shows a plurality of alternative acoustic echo cancellation systems that execute program code and data structures written to a computer usable medium or a non-transitory medium.

The local or distributed databases or memory 1104 may retain an ordered listing of executable instructions in a processor, device, or controller accessible medium for implementing logical functions. A logical function may be implemented through digital circuitry, through source code, or through analog circuitry. The software or logic 500-800 may be embodied in any computer-readable medium, signal-bearing medium, or other non-transitory medium for use by, or in connection with, an instruction executable system, apparatus, and device, resident to system that may maintain persistent or non-persistent connections. Such a system may include a computer system, a processor-based system, or another system that includes an input and output interface that may communicate with a publicly accessible or privately accessible distributed network through a wireless or tangible communication bus through a public and/or proprietary protocol.

A "computer-readable storage medium," "machine-readable medium," "propagated-signal" medium, and/or "signal-bearing medium" 1104 may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An acoustic echo cancellation system comprising:
 a buffer that writes remote side signals to one or more storage areas;
 a delay controller that filters and delays the remote side signals to correlate the remote side signals to local side signals;
 an acoustic echo cancellation core that pulls the remote side signals from the buffer through the delay controller; and
 a delay estimator that continuously generates an estimate of a delay between the stored remote side signals and the local side signals and is arranged to render a confidence level corresponding to the continuously generated estimate that indicates a degree of stability of the estimate, where the delay estimator continuously generates the estimate and renders the corresponding confidence level until the rendered confidence level exceeds redetermined value;
 where, when the confidence level exceeds a predetermined value, the acoustic echo cancellation core substantially cancels a portion of an echo or reverberation within the local side signals based on the estimate of the delay corresponding to the rendered confidence level that exceeds the predetermined level.

2. The acoustic echo cancellation system of claim 1 further comprising a delay detector that automatically identifies and records in a memory signal differences between the remote side signals and the local side signals.

3. The acoustic echo cancellation system of claim 2 where the delay detector identifies coherence differences in real-time.

4. The acoustic echo cancellation system of claim 2 where the acoustic echo cancellation core identifies and records the signal differences between the remote side signals and the local side signals when the remote side signals and the local side signals lack a spectral coherence to provide a fault tolerance.

5. The acoustic echo cancellation system of claim 2 where the delay estimator is enabled by the delay detector.

6. The acoustic echo cancellation system of claim 2 further comprising:
bypass components that allow the local side signals to bypass the acoustic echo cancellation core while the acoustic echo cancellation core models an acoustic space, a local side speaker, and an input device; and
where the delay controller resets the delay detector until the acoustic echo cancellation core models the acoustic space, the local side speaker, and the input device.

7. The acoustic echo cancellation system of claim 2 further comprising:
bypass components that allow the local side signals to bypass the acoustic echo cancellation core while the acoustic echo cancellation core converges to a cancellation level; and
where the delay controller resets the delay detector until the acoustic echo cancellation core converges to a cancellation level.

8. The acoustic echo cancellation system of claim 1 further comprising bypass components that allow the local side signals to bypass the acoustic echo cancellation core while the acoustic echo cancellation core models an acoustic space, a local side speaker, and an input device.

9. The acoustic echo cancellation system of claim 1 where the delay estimator compares entire buffered remote side signals to unaltered local side signals in a time domain.

10. The acoustic echo cancellation system of claim 1 where the delay estimator is configured to remain in a locked out state until the acoustic echo cancellation core models an acoustic space, a local side speaker, and an input device.

11. The acoustic echo cancellation system of claim 1 where the delay estimator is configured to remain in a locked out state for a predetermined period while the acoustic echo cancellation core models an acoustic space, a local side speaker, and an input device.

12. The acoustic echo cancellation system of claim 11 further comprising one or more secondary acoustic echo cancellation cores that cancel at least a portion of an echo or reverberation within the local side signals while the acoustic echo cancellation core converges to a cancellation level.

13. The acoustic echo cancellation system of claim 12 where at least one of the one or more secondary acoustic echo cancellation cores comprises a half-duplex core.

14. The acoustic echo cancellation system of claim 12 where at least one of the one or more secondary acoustic echo cancellation cores comprises an echo suppressor and an echo canceller.

15. A non-transitory computer readable medium including a program code for removing echo and reverberation from local side signals in a mobile communication device comprising:
program code that enables a filtering and delaying of remote side signals to correlate to local side signals;
program code that continuously generates an estimate of a delay between the remote side signals and the local side signals when a substantial difference in coherence is detected;
program code that renders a confidence level corresponding to the continuously generated estimate of the delay that indicates a degree of stability of the estimate, where the confidence level comprises a correlation measurement, a discrete value, or a temporal heuristic; and
program code that, when the confidence level exceeds a predetermined value, substantially cancels a portion of the echo or reverberation within the local side signals based on the estimate of the delay corresponding to the confidence level that exceeds the predetermined value, the confidence level, and the remote side signals.

16. The non-transitory computer readable medium of claim 15 further comprising program code that that automatically identifies and records in a memory coherence differences between the remote side signals and the local side signals when the remote side signals and the local side signals lack a spectral coherence.

17. The non-transitory computer readable medium of claim 16 where the coherence differences is identified in real-time.

18. The non-transitory computer readable medium of claim 15 further comprising program code that delays the program code that substantially cancels the portion of the echo or reverberation within the local side signals while an acoustic space, a local side speaker, and an input device is modeled.

19. The non-transitory computer readable medium of claim 18 further comprising program code that delays the program code that continuously generates an estimate of a delay between the remote side signals and the local side signals until a cancellation level is attained.

20. A method of removing echo and reverberation from local side signals in a communication device comprising:
filtering and delaying remote side signals to correlate the remote side signals to local side signals;
generating an estimate of a delay between the remote side signals and the local side signals continuously when coherence differences between the remote side signals and the local side signals are detected;
rendering a confidence level corresponding to the continuously generated estimate of the delay that indicates a degree of stability of the estimate, where the confidence level comprises a correlation measurement, a discrete value, or a temporal heuristic; and
canceling, when the confidence level exceeds a predetermined value, a portion of the echo or reverberation within the local side signals based on the estimate of the delay corresponding to the confidence level that exceeds the predetermined value.

21. The method of claim 20, where the cancelling of the portion of the echo and reverberation is based on a heuristic and the remote side signal.

22. The method of claim 20 where the cancelling of the portion of the echo and reverberation is based on a convergence level and a period of time.

23. The method of claim 21 where the act of cancelling a portion of the echo or reverberation occurs through a plurality of separate and different acoustical echo cancellers.

* * * * *